(12) United States Patent
Salters et al.

(10) Patent No.: US 8,016,473 B2
(45) Date of Patent: Sep. 13, 2011

(54) SYMMETRICAL LIGHT GUIDE STRUCTURE FOR LED-BASED LIGHTING DEVICE

(75) Inventors: Bart Andre Salters, Eindhoven (NL); Marcellinus Petrus Carolus Michael Krijn, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 299 days.

(21) Appl. No.: 12/305,130

(22) PCT Filed: Jun. 15, 2007

(86) PCT No.: PCT/IB2007/052285
§ 371 (c)(1),
(2), (4) Date: Dec. 16, 2008

(87) PCT Pub. No.: WO2008/007254
PCT Pub. Date: Jan. 17, 2008

(65) Prior Publication Data
US 2010/0061080 A1    Mar. 11, 2010

(30) Foreign Application Priority Data
Jun. 22, 2006 (EP) .................................. 06115854

(51) Int. Cl.
*F21V 7/04* (2006.01)
(52) U.S. Cl. ......... 362/616; 362/27; 362/97.1; 362/231; 362/613; 362/628
(58) Field of Classification Search ............ 362/27, 362/97.1, 231, 601, 612, 613, 616, 628, 629; 349/65
See application file for complete search history.

(56) References Cited

U.S. PATENT DOCUMENTS

| | | | |
|---|---|---|---|
| 5,913,594 A | 6/1999 | Iimura | |
| 6,951,401 B2 * | 10/2005 | Van Hees et al. | 362/612 |
| 7,413,331 B2 * | 8/2008 | Hatanaka et al. | 362/601 |
| 7,413,334 B2 * | 8/2008 | Baba | 362/616 |
| 2004/0246696 A1 | 12/2004 | Yoo | |
| 2005/0007753 A1 | 1/2005 | Van Hees et al. | |
| 2008/0037284 A1 * | 2/2008 | Rudisill | 362/629 |

FOREIGN PATENT DOCUMENTS

| | | |
|---|---|---|
| EP | 1669666 A1 | 6/2006 |
| EP | 1397610 B1 | 12/2007 |
| GB | 2393845 A | 4/2004 |
| WO | 2002097324 A1 | 12/2002 |
| WO | 2004008023 A1 | 1/2004 |

* cited by examiner

*Primary Examiner* — Stephen F Husar

(57) ABSTRACT

A device (100) for diffusing light comprising a light guide (101), light input means (102), and light output means (103). The light input (102) and light output (103) means are connected to the light guide (101), and the device (100) is arranged to allow light of at least two separate frequencies from a light source (108, 109, 110) to enter the light guide (101) through the light input means (102), propagate through said light guide (101) and exit at the light output means (103). The light guide (101) is circumferential, such that light is allowed to propagate for a distance greater than the external dimensions of said light guide (101) before reaching the output means (103), and hence, producing a mix of the light from said at least two frequencies. A display apparatus in which the invention is implemented is also disclosed.

18 Claims, 3 Drawing Sheets

SYMMETRICAL LIGHT GUIDE STRUCTURE FOR LED-BASED LIGHTING DEVICE

This application is a national stage application under 35 U.S.C. §371 of International Application No. PCT/IB2007/052285 filed on Jun. 15, 2007, and published in the English language on Jan. 17, 2008, as International Publication No. WO/2008/007254, which claims priority to European Application No. 06115854.9, filed on Jun. 22, 2006, incorporated herein by reference.

TECHNICAL FIELD

The present invention relates to a light guide structure for mixing colours, especially for ambient light applications using light emitting diodes.

BACKGROUND OF INVENTION

For several new LED based lighting systems, light guides are used. Such a light guide, typically a flat or curved piece of transparent plastic or glass, usually serves two purposes. It guides light from a light source, e.g. one or more light emitting diodes (LEDs), to a desired spot, and helps it mixing the colours from individual red, green and blue LEDs. It is especially important with the mixing of colours, as a non-perfect mixing results in coloured edges and shadows, while white surfaces will not be white, but coloured.

Light guides are used in many lighting applications, such as for general-purpose lighting or as a backlight source for an LCD monitor or television. One such example is disclosed in International Patent Application WO 2004/008023 A1 in which a light guide device comprising an LED group as a light source, a light guide plate for colour mixing and a light guide plate having a light output face is shown. The light guide device is provided as backlight source behind a liquid crystal display panel. It further shows a triangular prism for guiding light rays from the LED group to one end face of the light guide plate and triangular prisms for guiding light rays from the other end face of the light guide plate to one end face of the light guide plate.

Another possible application in which these light guides can be used is for instance in LED based ambient background lighting for television sets, such as a flat screen display panel. Light effects are generated around the TV that matches the image contents. The effect gives the impression of a larger virtual screen and a more immerse viewing experience. In addition, it reduces the strain on the eyes of the viewers.

In order to achieve this ambient background lighting effect it is known to have a lamp positioned behind a television set, which lamp emits light towards the wall. For these purposes it is common to use CCFL lamps. For several reasons, a LED based version would be preferred. There are however known issues with colour mixing and colour uniformity associated with the use of LEDs. For instance, in order to be able to generate all colours, at least three different LEDs are required, i.e. one red, one green and one blue LED. The three LEDs are inherently positioned next to each other, and because of the different positions, the individual colours will not perfectly overlap each other in the output.

Using more LEDs per primary colour is an alternative, yet this substantially increases the cost of a solution. Hence it would be preferably to have only a few, or even only one LED per colour.

Another common technique that is used is to optically position the 3 LEDs on top of each other, by means of dichroic filters. Thus one imaginary source can be created that can generate all colours. However, also this solution has serious drawbacks. The main disadvantages of dichroic filters are the cost and the difficult methods of producing these. Furthermore they are strongly angle-dependent; light striking them under a different angle than intended might be transmitted instead of reflected, or vice-versa. Also, it is very difficult to include such filters inside a light guide, which in its simplest form consists of a single piece of glass or transparent plastic (e.g. Polymethylmethacrylate (PMMA)).

In order to achieve a more uniform distribution of light comprised of several colours, it is a common technique to use light guides with the characteristic of diffusing light. For instance, with total internal reflection (TIR) light can be held inside the light guide. Only when light encounters a surface with an angle sufficiently close to the normal, light may exit the light guide. However, due to various drawbacks, also this technique is in need for improvements.

SUMMARY OF INVENTION

In view of the above, an object of the invention is to solve or at least reduce the problems discussed above. In particular, an object is to provide an improved light guide for producing improved colour composition.

Another object of the present invention is to improve the performance of a light guide both in the mixing of colours and with a gradual change in intensity.

The above objects, are obtained according to a first aspect of the present invention by a device for diffusing light comprising a light guide, light input means, and light output means. The light input and light output means are connected to the light guide. The device is arranged to allow light of at least two separate frequencies from a light source to enter the light guide through the light input means, propagate through the light guide and exit at the light output means. The light guide is circumferential, such that light is allowed to propagate for a distance greater than the external dimensions of the light guide before reaching the output means. Hence, the device produces a mix of the light from the at least two frequencies. With the wording circumferential, it is to be understood that the light guide defines a closed path or loop allowing for light to take a wide variety of individual paths of propagation so as to ensure good mixing of light comprising various frequencies. The confinement of light within the light guide is realized by having reflective surfaces, preferably along an outer, delimiting portion of the light guide. This can be achieved with reflectors or by having an adjacent material with a refractive index different from that of the light guide, such as to achieve total internal reflection. The refractive index of the adjacent material does not necessarily need to be different from that of the light guide. However, as an advantage to prevent losses, it helps if the adjacent material has a high index of refraction.

According to one embodiment of present invention, the light guide comprises a single piece.

According to another embodiment, the light guide comprises a die cast. As an advantage, this provides for efficient and cheap production.

According to one embodiment of present invention, the material is glass, plastic, PMMA or any combinations thereof.

According to one embodiment of present invention, the light input means comprises a first section of the light guide, and the light output means comprises a second section of the light guide.

According to one embodiment of present invention, the first and second sections are separated by a third section.

Further, the third section may preferably comprise a second material having a refractive index different from that of the first section. Again, the refractive index of the adjacent material does not necessarily need to be different from that of the light guide. Hence, as an advantage, total reflection is achieved. Also, the second material may be a fluid, such as a gas or liquid, preferably air. Further still, the third section may also comprise a coating such as to provide a reflective surface to the first section, such as by a curved reflector in air. As an advantage, ordinary reflection is achieved as compared to total reflection.

According to one embodiment of present invention, the first and second sections comprise gradually varying cross sections for improving light reflections against inner surface of the first section. Hence, the light guide assumes a dented form. In other words, sidewalls of the preferably tubular light guide at the light input means end are slightly bent. As a result, the light is focused towards the end of the tube, which as an advantage reduces light leakage through the sidewalls.

According to one embodiment of present invention, the light output means integrated with the second section and comprising a light out coupling structure having as an advantage that directionality of the outgoing light is improved. Furthermore, it also is advantageous in that better uniformity of light output is obtained, as well as an improved out coupling efficiency.

According to one embodiment of the present invention, the light guide comprises a connecting section connecting the first and second sections.

According to one embodiment of present invention, the connecting section comprises at least a first and a second connecting section, such as to achieve a symmetrical distribution of light propagation within the light guide. Further, the connecting section may preferably comprise an optical prism for leading light between the first and second sections. Alternatively, the connecting section may comprise a curved reflecting mirror, preferably surrounded by air. The refractive index of the prisms can be the same as that of the light guides. However, as an advantage to prevent losses, it helps if the prisms have a high index of refraction. It also helps in this respect if the prisms and the light guides are joined by means of an adhesive with a relatively low index of refraction.

According to one embodiment of present invention, the light source comprises light emitting diodes.

According to yet another embodiment of the present invention, the light guide is symmetrical in its structure. With symmetrical, it is for instance to be construed that the light guide comprises of two sections which are corresponding counter parts of each other, such that light can propagate in identical, but reverse paths through the light guide. Hence, as an advantage an exceptional performance in both mixing of colours as well as a gradual change in intensity is achieved.

The above objects are obtained according to a second aspect of the present invention by a display apparatus comprising a device according to the first aspect of the present invention.

According to one embodiment of the second aspect of the present invention, the device is arranged to provide ambient light to the apparatus. As an advantage, an impression of a larger virtual screen and a more immerse viewing experience is obtained. In addition, strain on the eyes of the viewers is reduced.

According to one embodiment of the second aspect of the present invention, the device is arranged at the sides of the display apparatus.

According to one embodiment of the second aspect of the present invention, the device arranged at the back of the display apparatus.

In other words, a couple of features related to the design of the device are especially advantageous. At first, due to the long path the light has to travel, a good mixing of the light is achieved. Secondly, although working with just one light source per colour, the light enters the out coupling structure from two sides simultaneously. This ensures that a perfectly symmetrical light distribution is achieved. Hence, as a particular advantage, the design allows for the light to go around in circles.

Further, due to this set-up a symmetrical light out coupling is achieved, even though only a single light source (per colour) is used. This is a highly desirable feature.

Furthermore, this structure ensures a long light path for each individual colour before being coupled out towards the wall, while at the same time maintaining a small, slim, aspect ratio and size.

DETAILED DESCRIPTION OF THE PRESENT INVENTION

Figure 1A:
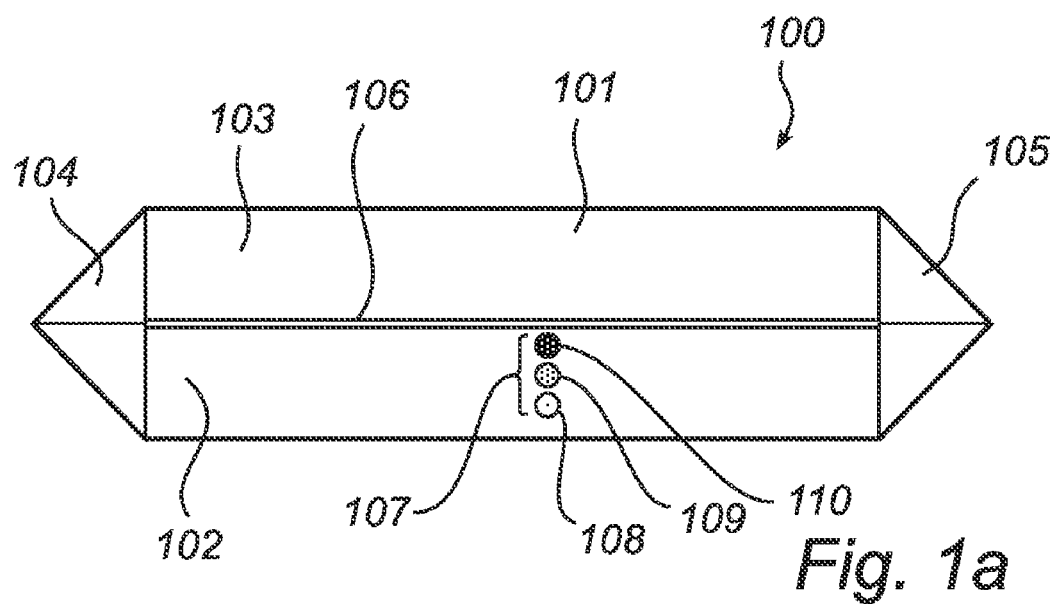
FIG. 1 sections a) and b) shows a device for diffusing light according to the present invention.
Figure 1B:
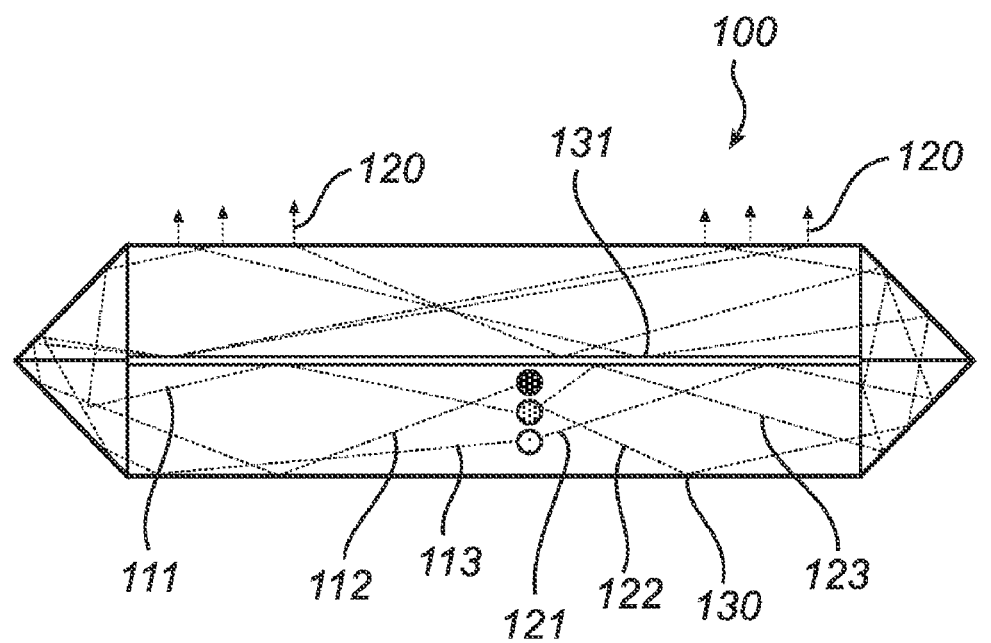

FIG. 1 shows a device 100 comprising a light guide 101, light input means 102, light output means 103, optical prisms 104 and 105, a void 106 and a set 107 of light emitting elements 108, 109 and 110. The void 106 is delimited by the double horizontal line in the middle of the device, and in a preferred embodiment according to the invention, the void constitutes an air gap. Alternatively to air, the space or void between the light input and light output sections may comprise vacuum or a fluid. The light emitting elements are situated in the light input means 102. Section a) of FIG. 1 illustrates the components of the device 100, and section b) illustrates a ray tracing simulation on the device 100 where arrows 111, 112, 113, 121, 122, and 123 indicate paths of travel from the light emitting elements 108, 109 and 110 until emerging 120 from the light output means 102 of the light guide 101. Also indicated are reflections 130 and 131 against the walls of the light guide 101. The air gap functions as a kind of mirror due to the effect known as Total Internal Reflection (TIR). Thus the light either propagates left or right from the light source, although it remains within the light guide structure. At both ends of the light guide, prisms are positioned. These 'bend' the light around the corner, into the preferably tube-like structured light output means. In the light output means, some sort of out coupling structure is present. Alternatively, curved reflecting mirrors can be used instead of the optical prisms 104 and 105 to guide light between the light input 102 and light output 103 means.

Figure 2A:
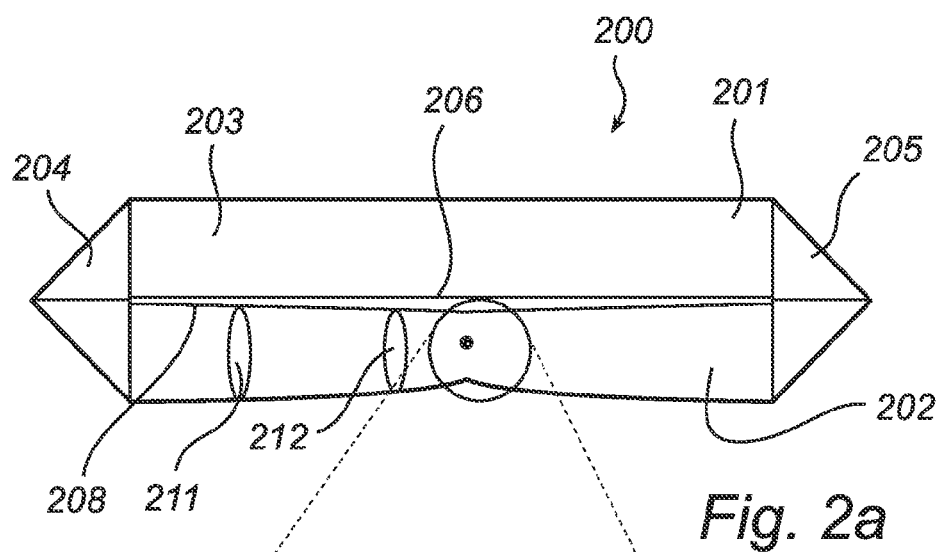
FIG. 2 shows a device according to a preferred embodiment of the present invention.
Figure 2B:
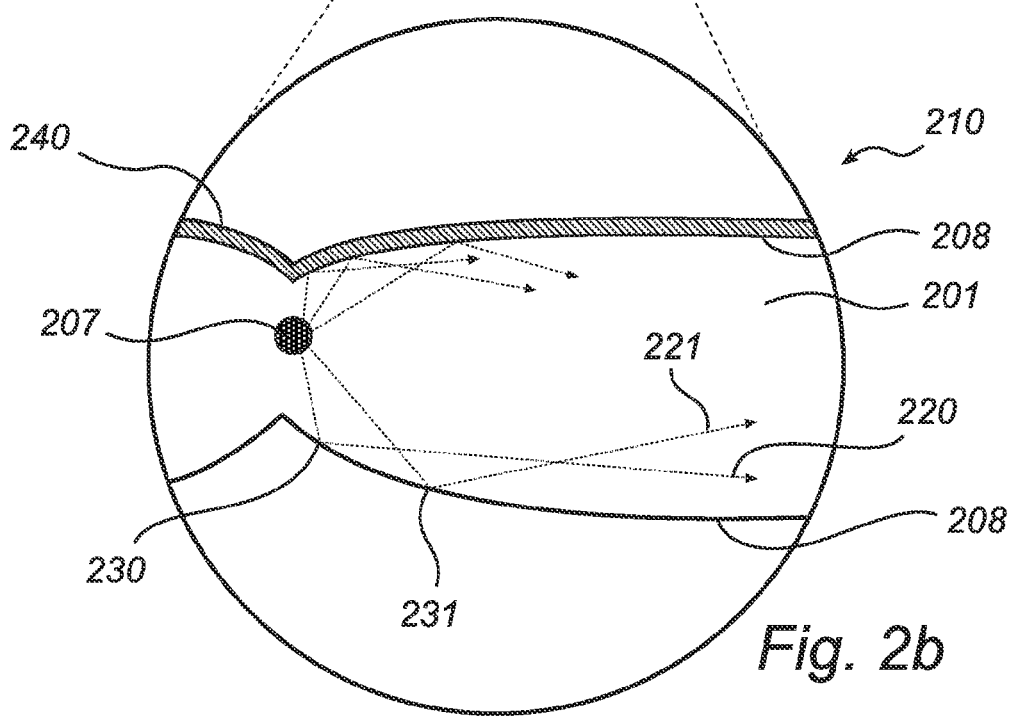

FIG. 2 shows a device 200 according to a preferred embodiment of the invention in which the dimensions of the light input means 202 of the light guide 201 have been altered in order to improve the light reflection. Similar to FIG. 1, the device 200 in section a) of FIG. 2 also comprises light output means 203, optical prisms 204 and 205, a void 206, and a light source 207. Furthermore, cross sections 211 and 212 indicate how the cross section along the section of the light guide 201 comprising the light input means 202 gradually decreases towards the light source 207. Section b) of FIG. 2 illustrates a detail 210 of the device 200 as depicted in section a) of FIG. 2. In section b) it is shown the light guide 202, the light source 207, a wall 208 of the light guide 202, and arrows 220 and 221 indicating rays of propagating light. The rays are shown to be reflected 230 and 231 at the wall 208 of the light guide, hereby changing their paths of directions. Further shown in section b) of FIG. 2 is a coating 240 applied to the surface of the light input means part of the light guide. The coating enables efficient reflection of light reaching the periphery of the light guide. The coating is shown only at a small section of the surface, but it may also be applied to a larger part of the surface of the device.

Figure 3:
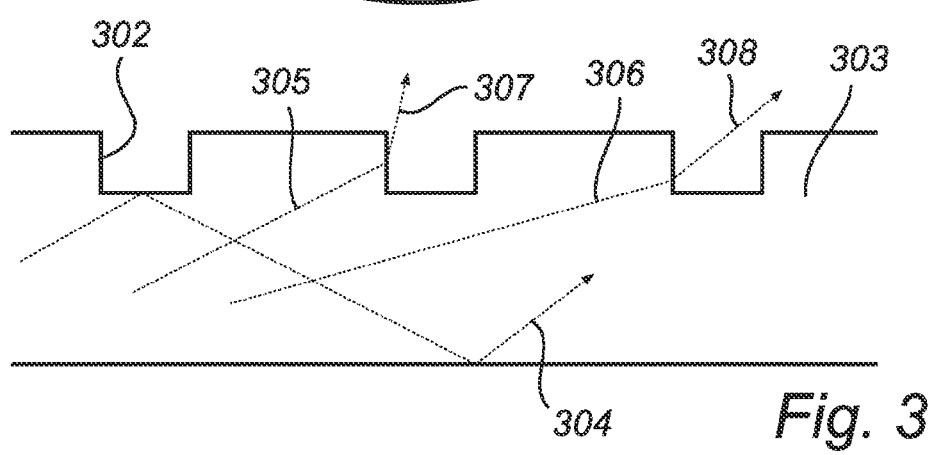
FIG. 3 shows a detail of a device according to another preferred embodiment of the present invention.

FIG. 3 shows a detail of an out coupling structure 302 utilized in the light output section 303 of a light guide 101 or 201 in a device 100 or 200. Arrows 304, 305 and 306 indicate rays of light exiting 307 and 308 the light output section 303.

Figure 4A:
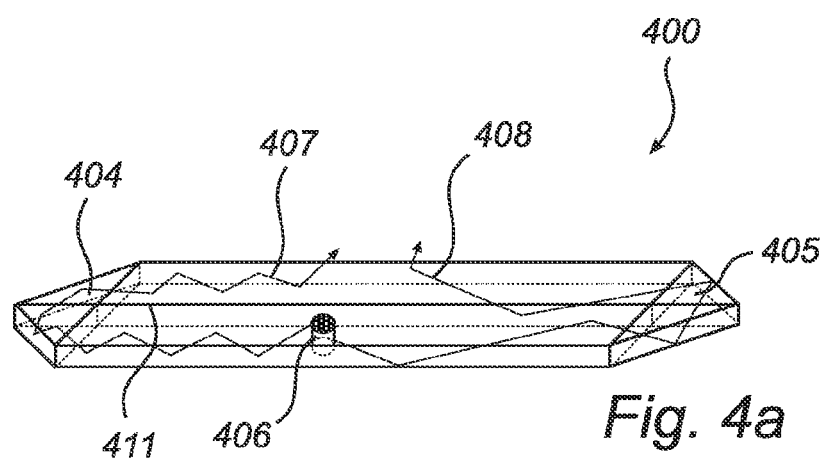
FIG. 4 shows three-dimensional views of a device in a first a) and a second b) embodiment.
Figure 4B:
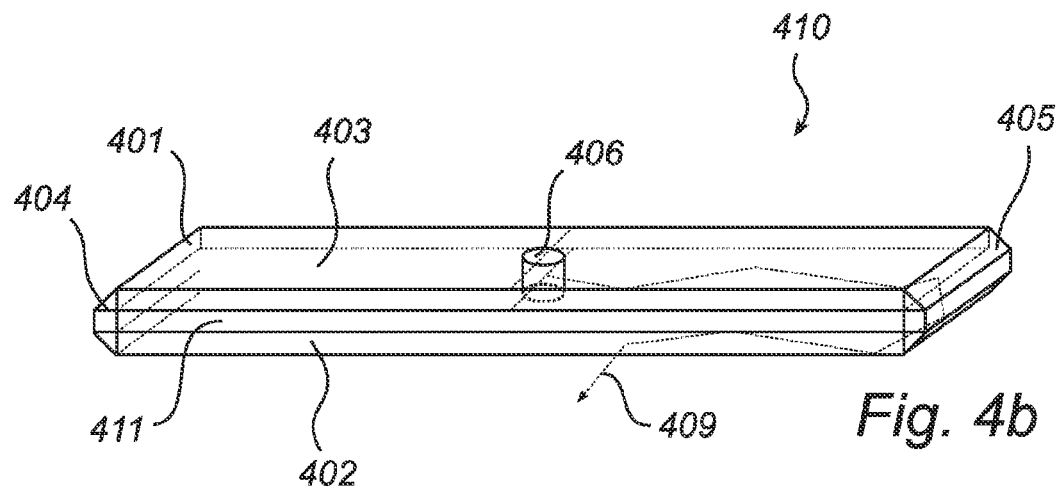

FIG. 4 shows three-dimensional views of a light guide device 401 with light input 402 and light output 403 sections next to each other 400 and on top of each other 410. Also indicated are prisms 404 and 405, a light source 406, light rays 407, 408 and 409, and a gap 411 between the light input 402 and light output 403 sections.

Further variations of design are possible, although still with the characteristic features of the invention. As an alternative, the light guide may be in the form of a compartment, such as a box-like structure with reflective and/or diffusive sides. Light is then guided through the compartment due to the multiple reflections on top bottom and the sides.

Figure 5:
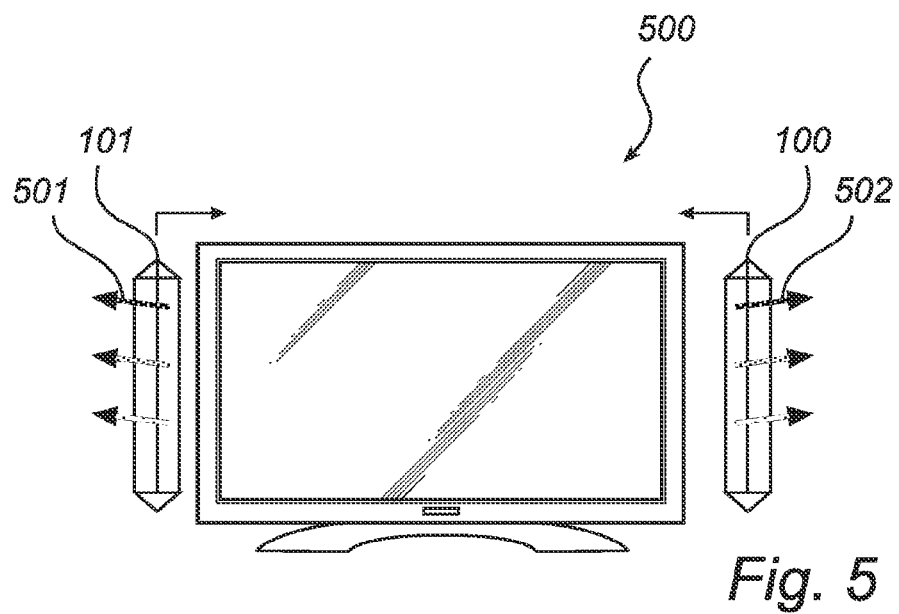
FIG. 5 shows a device according to the present invention being implemented in a television set.

FIG. 5 shows a television set 500 in which devices 100 are implemented. Arrows 501 and 502 indicate light emitted from the devices 100.

Additionally, the present invention may also advantageously be used in other areas of application such as for instance as a lamp or backlight for an LCD monitor or television.

The invention claimed is:

1. A device for diffusing light, comprising: a light guide, light input means, and light output means, said light input and light output means being connected to said light guide, said device being arranged to enable light of at least two separate frequencies from a light source to enter said light guide through said light input means, propagate through said light guide and exit at said light output means, wherein said light guide is circumferentially arranged in a closed loop for enabling said light from said light source to propagate along a circumferential path inside of said light guide before exiting at said output means, such that said light is able to propagate for a distance greater than the external dimensions of said light guide before reaching said output means thereby producing a mix of the light from said at least two frequencies, wherein said light input means comprises a first section of said light guide, and said light output means comprises a second section of said light guide, and wherein said light output means are integrated with said second section and comprise a light out coupling structure for improving directionality of the outgoing light.

2. The device according to claim 1, wherein said light guide is formed from a single piece of material.

3. The device according to claim 1, wherein said light guide comprises a die cast.

4. The device according to claim 1, wherein the material of the light guide is selected from the group consisting of: glass, plastic, PMMA and any combinations thereof.

5. The device according to claim 1, wherein said first and second sections are separated by a third section.

6. The device according to claim 5, wherein said third section comprises a second material having a refractive index different from that of said first section.

7. The device according to claim 5, wherein said third section comprises a coating on said first section.

8. The device according to claim 1, wherein said first and second sections comprise gradually varying cross sections for improving light reflections against an inner surface of said first section.

9. The device according to claim 1, wherein said light guide comprises a connecting section connecting said first and second sections.

10. The device according to claim 9, wherein said connecting section comprises at least a first and a second connecting section, such as to achieve a symmetrical distribution of light propagation within said light guide.

11. The device according to claim 9, wherein said connecting section comprises an optical prism for leading light between said first and second sections.

12. The device according to claim 9, wherein said connecting section comprises a curved reflecting mirror.

13. The device according to claim 1, wherein said light source comprises one or more light emitting diodes.

14. The device according to claim 1, wherein said light guide is structurally symmetrical.

15. A display apparatus comprising at least one device for diffusing light, comprising: a light guide, light input means, and light output means, said light input and light output means being connected to said light guide, said device being arranged to enable light of at least two separate frequencies from a light source to enter said light guide through said light input means, propagate through said light guide and exit at said light output means, wherein said light guide is circumferentially arranged in a closed loop for enabling said light from said light source to propagate along a circumferential path inside of said light guide before exiting at said output means, such that said light is able to propagate for a distance greater than the external dimensions of said light guide before reaching said output means, thereby producing a mix of the light from said at least two frequencies, wherein said light input means comprises a first section of said light guide, and said light output means comprises a second section of said light guide, and wherein said light output means are integrated with said second section and comprise a light out coupling structure for improving directionality of the outgoing light.

16. The display apparatus according to claim 15, wherein said at least one device is configured to provide ambient light proximate to said apparatus.

17. The display apparatus according to claim 16, wherein said at least one device is disposed on a side of said display apparatus.

18. The display apparatus according to claim 16, wherein said at least one device is disposed on an non-imaging back surface of said display apparatus.

* * * * *